US006978326B2

(12) United States Patent
Rieu

(10) Patent No.: US 6,978,326 B2
(45) Date of Patent: Dec. 20, 2005

(54) METHOD AND APPARATUS FOR EDITING IMAGES REPRESENTING IDEAS

(75) Inventor: Georges Emile Rieu, Saint-Affrique (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 93 days.

(21) Appl. No.: 10/257,413

(22) PCT Filed: Apr. 6, 2001

(86) PCT No.: PCT/FR01/01047

§ 371 (c)(1),
(2), (4) Date: Nov. 12, 2003

(87) PCT Pub. No.: WO01/77803

PCT Pub. Date: Oct. 18, 2001

(65) Prior Publication Data

US 2004/0216051 A1 Oct. 28, 2004

(30) Foreign Application Priority Data

Apr. 10, 2000 (FR) .................................. 00 04592

(51) Int. Cl.[7] ................................................ G06F 3/00
(52) U.S. Cl. ......................... 710/65; 717/142; 717/136
(58) Field of Search .......................... 710/65; 717/142, 717/136; 382/224, 229

(56) References Cited

U.S. PATENT DOCUMENTS

| | | | | |
|---|---|---|---|---|
| 5,065,347 | A * | 11/1991 | Pajak et al. | 345/835 |
| 5,857,212 | A * | 1/1999 | Van De Vanter | 715/519 |
| 6,122,741 | A * | 9/2000 | Patterson et al. | 713/200 |
| 6,173,441 | B1 * | 1/2001 | Klein | 717/142 |
| 6,453,465 | B1 * | 9/2002 | Klein | 717/141 |
| 6,691,282 | B1 * | 2/2004 | Rochford et al. | 715/514 |
| 6,785,677 | B1 * | 8/2004 | Fritchman | 707/6 |

FOREIGN PATENT DOCUMENTS

| | | |
|---|---|---|
| EP | 0660216 | 6/1995 |
| GB | 2199434 | 7/1988 |
| WO | WO 96/09579 | 3/1996 |

* cited by examiner

*Primary Examiner*—Kim Huynh
*Assistant Examiner*—Harold Kim
(74) *Attorney, Agent, or Firm*—Blakely, Sokoloff, Taylor & Zafman

(57) ABSTRACT

The invention concerns editing of images representing ideas. More particularly, it concerns a method for editing images representing ideas using an apparatus comprising an input device and a display device. It consists in displaying, in the input representation zone, a first sub-collection of images and selecting an image of the first sub-collection by selection with a first control which causes the selected image to be displayed, or by selection with a second control which causes a second sub-collection of images to be displayed representing ideas related to the image representing a selected idea. The invention is applicable to international communications.

13 Claims, 5 Drawing Sheets

METHOD AND APPARATUS FOR EDITING IMAGES REPRESENTING IDEAS

The present patent application is a non-provisional application of International Application No. PCT/FR01/01047, filed Apr. 6, 2001.

The present invention relates to a method of editing lexeme-images selected from a collection, using an electronic appliance possessing a display device and an input device, and also to an electronic appliance for performing the method.

The two hemispheres of the human brain correspond to totally different universes for processing thought information. Whereas the left brain is specific to analyzing detail, the right brain is specific to overall vision and to visual language. More precisely, to create a thought, the right brain operates at very high speed to combine and associate ideas in the form of images, and subsequently, once the thought has been generated, it transfers it to the left brain which formulates it in a phonetic language and controls verbal expression thereof. In the natural language of the brain, an idea in the form of an image has the characteristics of an image representative of a lexeme.

In linguistics, the term "ideogram" is used to designate minimal graphics signs that constitute a morphene or a word (a "lexia"), and the term "lexeme" is used to designate a meaningful unit. For example, the lexias "soap", "soapy", "soaping", etc. correspond to a single lexeme. A lexeme may be expressed by sounds (phonetics) or by a simple image. The present text relates to such images representative of ideas and referred to as "lexeme-images", and it refers in particular to those defined in the work entitled "Le langage naturel du cerveau: "Flash Bren" langue du futur?" [Natural language and the brain: "Flash Bren" language of the future?], by George Rieu, published by Brenator (ISBN: 2-9504144-1-9).

To understand the invention, it is helpful to define more clearly what lexeme-images constitute in the "Flash Bren" language.

The above-specified work sets out the bases used for establishing that collection of lexeme-images, in particular the physiological, psychophysiological, and historical bases, with reference to various ways of writing thoughts and how they evolve.

Although the natural language of the brain is extremely promising for exchanges between people having different languages, for example between web surfers from different regions of the world, or for establishing a pivot language for translation between other languages, the above-specified work considers writing lexeme-images only by hand or by printing them. Such means are relative inefficient, and above all unsuited for exchanging electronic messages.

The invention relates to powerful means for editing lexeme-images in order to enable messages to be written quickly using "Flash Bren" lexeme-images.

Before describing the invention, it is helpful to consider some more precise characteristics of these lexeme-images. Given that each lexeme-image is intended to represent an elementary thought unit rapidly understood by the right brain, it needs to be relatively simple and global, while nevertheless leaving no doubt as to its global meaning. If any doubt exists, then processing switches from the right brain to the left brain which works much less swiftly, and the process of understanding is slowed down.

In its bottom portion, FIG. 1 shows "intermediate" level lexeme-images, i.e. images that constitute a compromise between excessive simplification and introducing excessive details. This "intermediate" representation is preferably associated with colors that facilitate understanding. For example in FIG. 1, the second lexeme-image which represents a "policeman" includes a cap the inside of which is dark in color so as to facilitate understanding that it is a cap; nevertheless, it takes a long time to color the cap using a crayon on a sheet of paper. Consequently, in its "primary" form, the lexeme-image would be represented without the cap being colored. The lexeme-image can then be drawn with a single pencil stroke. The stroke begins with the peak, goes to the back of the cap, rises to the top portion of the cap, goes down to draw the entire face, and then rises to the back of the cap prior to coming down again. In its "primary" form, the "Flash Bren" language comprises lexeme-images which are advantageously drawn using one or two pencil strokes, with a maximum of five for the most complicated lexeme-images. Nevertheless, in addition to this primary representation which is useful for writing and the secondary representation which is useful for publishing, preferably in color, there can also exist a representation that is more elaborate in which certain lexeme-images can be represented in greater detail, particularly if the lexeme-image, while still representing an elementary thought unit, nevertheless relates to a thought that is "multiple", as described in greater detail below with reference to FIG. 9.

The problem to which the invention relates, i.e. that of editing images., specifically "Flash Bren", lexeme-images, is described below in greater detail.

Ideogram editors already exist, in particular for the Chinese and Japanese languages. Those editors generally call on a subcollection of ideograms corresponding to a phonetic element input via the keyboard. Thus, for Japanese language editors, the user of an alphanumeric keyboard inputs a phonetic expression generally comprising three to ten characters. Once this phonetic element has been input, the user presses a command key and a subcollection of ideograms appears from which the user can select one particular ideogram.

Selecting a single ideogram thus requires several characters to be keyed in, followed by a command code, followed by selection from a table, e.g. using a pointing member. Editing in this way is extremely slow. It is not possible to represent a full collection of ideograms given the very great number of them (thousands) and the difficulty of classifying them (several ideograms for a single sound). Inputting an ideogram is always done by means of a chain of operations which must be carried right through in order for a single ideogram to be displayed.

The invention relates to a method of editing lexeme-images, said method being totally different from known methods. It relies on the fact that the lexeme-images of the "Flash Bren" language represent elementary units of thought. It is thus possible to use the conceptual links that exist in the brain between elementary units of thought by using only these elementary units of thought as represented by the lexeme-images.

Thus, it is possible to prepare a first restricted subcollection of lexeme-images, e.g. comprising 50, 100, or 200 lexeme-images, covering the entire field of thought; if the desired lexeme-image is to be found in this "root" subcollection, it is selected by positioning the cursor on it, and it is then edited simply by means of a first command. If the desired lexeme-image is not to be found in this subcollection, an associated lexeme-image is selected by positioning the cursor on it, and then calling up another subcollection of lexeme-images by means of a second command, this other subcollection of lexeme-images having a defined thought relationship with the selected lexeme-image and with the desired lexeme-image.

In a first example, the root subcollection comprises very general elementary units of thought, and selecting a lexeme-image from this root subcollection gives access to a second subcollection comprising lexeme-images which deal more precisely the thought relating to the selected lexeme-image.

In a second example, the root subcollection comprises lexeme-images representative of thought elements that are simple and generic, and the second subcollection comprises lexeme-images of thought elements that are more specific, containing at least a portion of the lexeme-image selected in the first subcollection. These two examples are described in greater detail with reference to FIGS. 8 and 9.

Consequently, an essential characteristic of the invention is that, at each stage of selection, a lexeme-image is selected either for editing directly, or for giving access to another subcollection of lexeme-images associated with the selected lexeme-image. This method of proceeding makes it possible to write extremely fast, much quicker than by conventional alphanumeric typewriting and, a fortiori, much faster than known methods of editing ideograms in the Chinese or Japanese languages.

Naturally, the process of selecting another subcollection of lexeme-images may be used several times in succession.

More precisely, the invention provides an editing method for editing lexeme-images selected from a collection of lexeme-images and using an electronic appliance possessing a display device and an input device, the display device having an editing zone and an input-representing zone; according to the invention, the method comprises: displaying in the input-representing zone a first subcollection of lexeme-images selected from the collection of lexeme-images; and executing a selection operation to select a lexeme-image from the first subcollection, the operation being selected from: a first selection operation for selecting a lexeme-image of the first subcollection by a first command which causes the selected lexeme-image to be displayed in the editing zone of the display device; and a second selection operation for selecting a lexeme-image of the first subcollection by a second command which causes a second subcollection of lexeme-images associated with the selected lexeme-image to be displayed in the input-representing zone of the display device.

In a variant implementation, the method further comprises, after the second selection operation, another operation of selecting a lexeme-image of the second subcollection, this operation being selected from a first selection operation for selecting a lexeme-image of the second subcollection by a first command which causes the selected lexeme-image to be displayed in the editing zone of the display device; and a second selection operation for selecting a lexeme-image of the first subcollection by a second command which causes a second subcollection of lexeme-images associated with the selected lexeme-image to be displayed in the input-representing zone of the display device.

In a first implementation that is of logical type, the lexeme-images of the first subcollection are representative of examples of thought that are simple and generic, and the lexeme-images of the second subcollection are representative of elements of thought that are more specific than the lexeme-images of the first subcollection. In this case, the lexeme-images of the third subcollection are preferably representative of elements of though that are more specific than those of the lexeme-images of the second subcollection.

In a second implementation that is of analytical type., the lexeme-images of the first subcollection are representative of elements of thought that are simple and generic, and the lexeme-images of the second subcollection are representative of elements of thought that are more specific and that contain at least a portion of the lexeme-image selected in the first subcollection.

In another implementation, when the input device comprises a keyboard, the method comprises displaying an image of the keyboard in the input-representing zone, in which image at least some of the keys carry two signs, firstly the sign carried by the corresponding key of the keyboard and secondly the lexeme-image that is selected by operating the key.

In a variant of this other implementation, it is advantageous for one of the first and second commands to comprise operating the key to be selected, and the other of the first and second commands to comprise operating the key to be selected simultaneously with a second key.

In another implementation, when the input device comprises a pointer device provided with at least two buttons, the first command comprises operating a first button and the second command comprises operating a second button.

In another implementation, when the input device comprises at least a portion forming a graphics tablet (i.e. a device enabling an image to be input on a background which is not a display screen), the method advantageously further comprises an operation of shape recognition for identifying drawings formed on the tablet and for displaying either the corresponding lexeme-images, or the drawings themselves.

In a variant implementation, in addition to displaying the sequence of successively selected lexeme-images disposed on at least one line, the method advantageously comprises displaying, in an edit window, a sequence of phonetic elements corresponding to the lexeme-images and aligned with them on at least one line parallel to the corresponding line of lexeme-images.

In another variant implementation, in addition to displaying the sequence of successively selected lexeme-images disposed on at least one line, the method advantageously comprises displaying, in an edit window, a sequence of language elements in a language corresponding to the lexeme-images and aligned therewith on at least one line parallel to the corresponding line of lexeme-images. The language elements of a language are constituted, for example, by ideograms or groups of ideograms in the Chinese language.

In an advantageous application, the lexeme-images edited by implementing the method constitute at least a portion of a message, and the method further comprises an operation of sending the message by means of an electronic mail system.

In another advantageous application, when the input device comprises a keyboard, the selection of a lexeme-image is accompanied by the emission of a lexeme sound, i.e. of sounds that represent the lexeme-image.

The invention also provides an electronic appliance comprising a display device and an input device for implementing the above-specified editing method, in which the display device has an editing zone and an input-representing zone.

In a first embodiment, the appliance has a touch-sensitive screen (i.e. a device capable of displaying an image and carrying a touch-sensitive device enabling input to be performed that depends on particular location on the screen) forming at least a portion of the input device. In a first variant of this first embodiment, the touch-sensitive screen constitutes both the display device and the input device, the input device being constituted by a touch-sensitive device covering at least the input-representing of the display device. In another variant of this first embodiment, the touch-sensitive screen forms, in at least a portion thereof, a graphics tablet forming part of the input device.

In a second embodiment, the appliance has a screen forming the display device and a keyboard forming at least a portion of the input device, and the input-representing zone of the screen contains an image of the keyboard.

In a third embodiment, the appliance has a screen forming the display device and a pointer device forming the input device and co-operating with the input-representing zone of the display device.

In a variant, the input device has a secondary input device comprising a microphone and a voice recognition tool which displays successive lexeme-images recognized on the basis of being uttered. This characteristic is possible because only one lexeme-image corresponds to a lexeme sound.

In another variant, the appliance further comprises a voice synthesis tool which utters a sequence of phonetic elements corresponding to the lexeme-images.

In another variant, the appliance further comprises a voice synthesis tool which utters in succession a sequence of language elements of the Chinese language corresponding to the lexeme-images.

In a particularly advantageous embodiment, the appliance further comprises a tool for connection to the Internet.

In an embodiment, the appliance further constitutes a mobile telephone.

Before moving on to detailed description of the characteristics of the editing method of the invention, it is helpful to take note of an additional characteristic of the "Flash Bren" language as a pivot language. FIG. 1 shows in succession a sentence in the English language, the same sentence in Chinese, and the same sentence in the "Flash Bren" language. FIG. 2 shows in greater detail the correspondence between the last two lines of FIG. 1, each "Flash Bren" lexeme-image being associated with one, two, three or more Chinese ideograms. The sentence written in the "Flash Bren" language can thus be translated directly into Chinese merely by replacing the "Flash Bren" lexeme-image by the Chinese ideogram or group of ideograms. The same remark applies in the opposite direction.

Naturally, this property is not universal, but it does show how the "Flash Bren" language can constitute a pivot language. In general, since only one lexeme-image corresponds to a lexeme sound, passing from a language to "Flash Bren" can be automatic, however the opposite transformation is more complicated since it needs to take account in particular of the rules of grammar of the language concerned.

Other characteristics and advantages of the invention appear better from the following description of implementations, made with reference to the accompanying drawings, in which:

FIGS. 1 and 2, described above, merely show a sentence edited in different languages;

Figure 3:
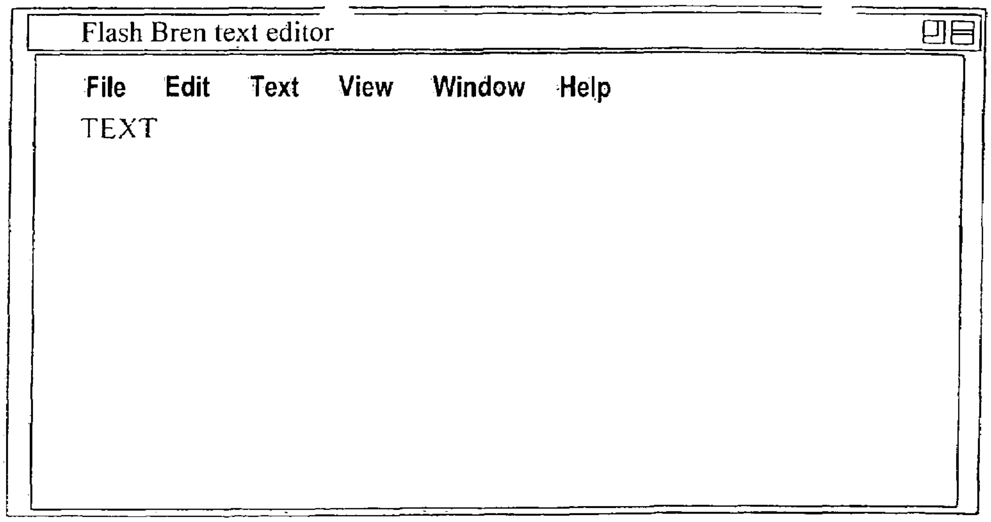
FIG. 3 shows an example of an edit window in a display device, together with alphanumeric text.
Figure 4:
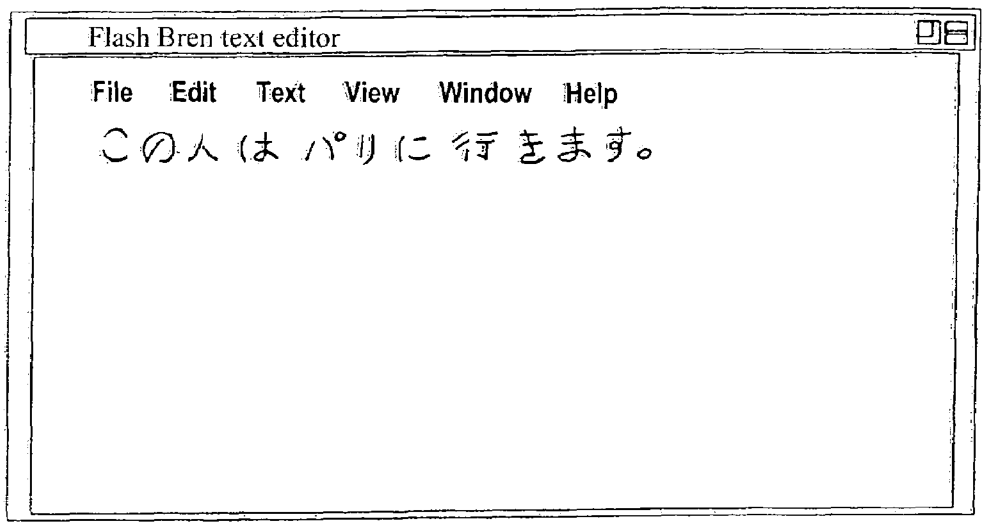
FIG. 4 shows a display window analogous to that of FIG. 3, but displaying Japanese ideograms selected using the alphanumeric keyboard.
Figure 5:
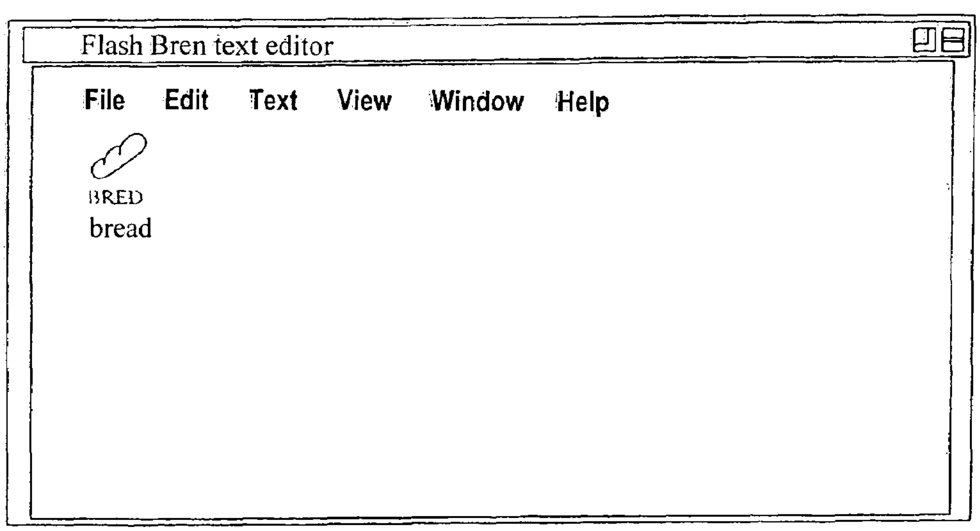
FIG. 5 is an edit window analogous to that of FIGS. 3 and 4, but in which there is placed a lexeme-image of the "Flash Bren" language, together with its phonetic pronunciation and the corresponding word in a language.

The editing method of the invention implements a display device and an input device. The display device may be merely a window displayed on a computer screen or on any screen. FIGS. 3 to 5 show an example of a display device which is capable of displaying in various formats. For example, FIG. 3 shows an English word input using alphanumeric characters. FIG. 4 shows a series of Japanese ideograms and phonemes edited using the alphanumeric keyboard. FIG. 5 shows a "Flash Bren" lexeme-image, together with its phonetic pronunciation and the corresponding English word that can optionally also be made to appear.

In addition to the usual functions of an edit window, it should be observed that the window of FIGS. 3 to 5 possesses an optional advantageous characteristic, that of displaying a plurality of parallel edit lines. These lines may have a specific display function (e.g. lexeme-images alone, phonetic elements alone, etc.) or, on the contrary each of them may enable an arbitrary series of elements to be displayed, even including drawings input using a graphics tablet, where appropriate, and possibly also formatted to a determined size.

The input device implemented by the edit method nevertheless has characteristics which are original. For input purposes it shows in succession a plurality of subcollections of elements. These elements may be "Flash Bren" lexeme-images (FIGS. 7 and 8) or merely alphanumeric characters (FIG. 6) or any other element.

Figure 6:
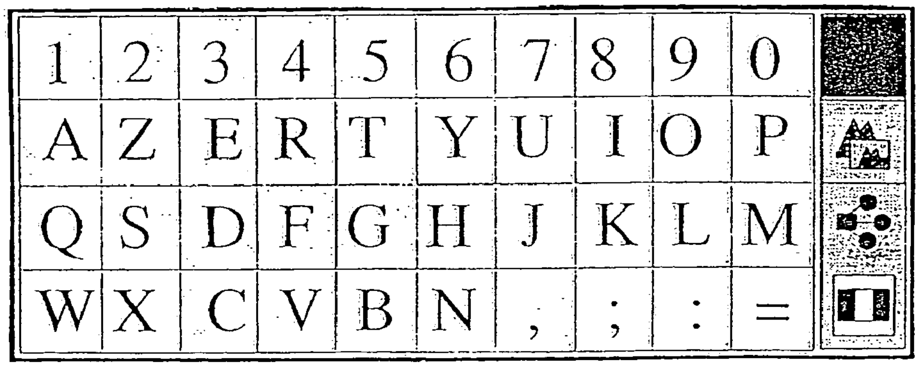
FIG. 6 shows an example of a keyboard suitable for use in the invention, in a form for display on a touch-sensitive screen, and representing alphanumeric characters.

In the embodiment of FIG. 6, it can be seen that the right-hand column of the input device has a certain number of boxes for selecting an alphanumeric alphabet for editing text as shown in FIG. 3, or for selecting an alphabet corresponding to another language (by selecting the bottom right-hand box which carries a flag for defining the language), or else for selecting one of the two methods of selecting "Flash Bren" language subcollections. These two methods are the logical method as illustrated by FIG. 8 and the analytic method as illustrated by FIG. 9.

Figure 8:
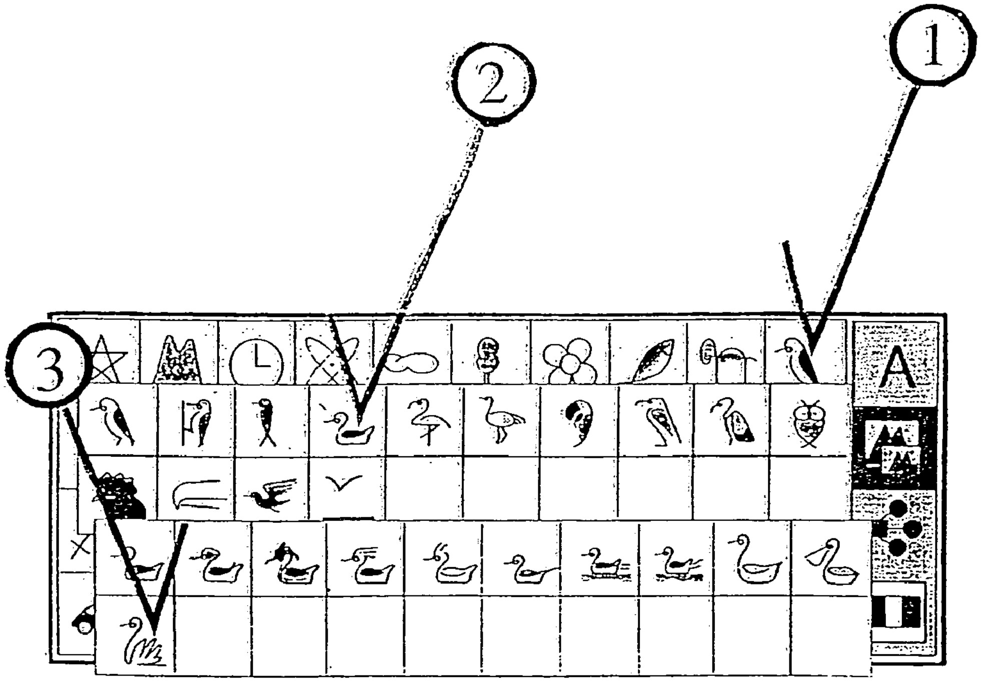
FIG. 8 is a conceptual view showing successive displays of first, second, and third subcollections using the method of the invention.
Figure 9:
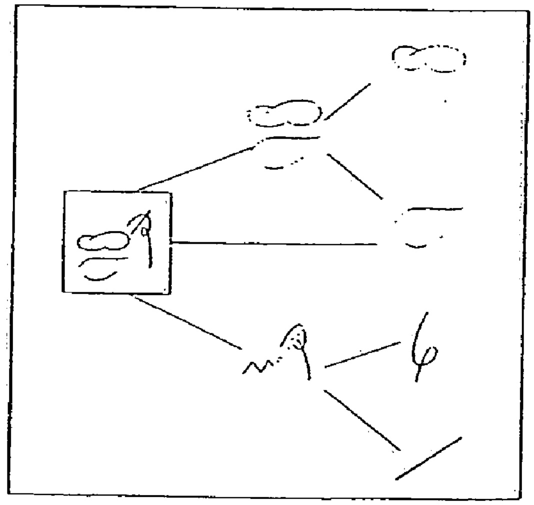
FIG. 9 is a diagram showing the construction of another type of root subcollection.

FIG. 8 serves to describe an essential characteristic of the invention. In this figure, three subcollections of lexeme-images are shown in offset form. Nevertheless, it should be understood that only one of these subcollections is accessible at any given instant. Navigating in the reverse direction through the subcollections, i.e. from a third subcollection to the second subcollection, or from a second subcollection to the first, as the case may be, or directly to any preceding subcollection, is performed by means of any suitable specific command (not shown) such as a command selecting one of the displayed boxes.

Figure 7:
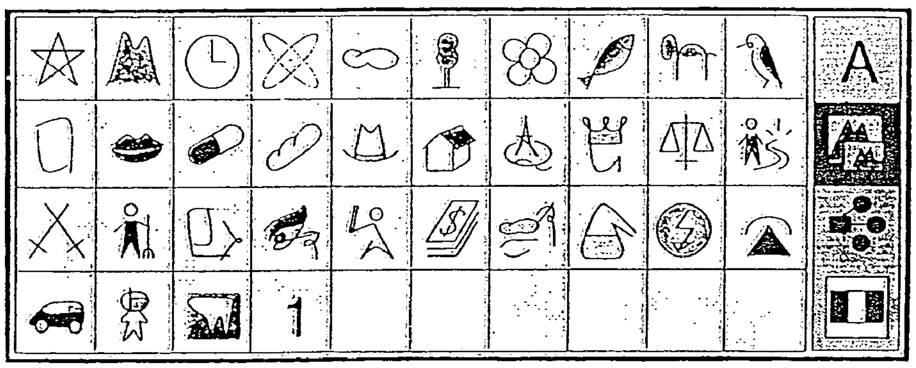
FIG. 7 shows the FIG. 6 keyboard when it is displaying a subcollection of "Flash Bren" lexeme-images.

In the first subcollection as also shown in FIG. 7, the user places the cursor of the pointer on one of the lexeme-images, e.g. the bird in the top right-hand corner. At this moment, the user has two commands available, for example the right button or the left button of a mouse. If the left mouse button is pressed, then the selected lexeme-image of a "bird" is displayed on the display window. However, if the right button is pressed then a second subcollection representing birds appears. Assume that the user then places the cursor on the fourth lexeme-image along the top line of this second subcollection. If the user presses the left mouse button, then the "duck" lexeme-image appears in the display window. However, if the user presses the right mouse button, then a more detailed subcollection of birds of the duck type appears. In this subcollection, the user can then select the "swan" lexeme-image by placing the pointer cursor on the first lexeme-image of the second line in the third subcollection and pressing the left mouse button.

When using a touch-sensitive screen, the two commands can be as follows: making contact between the tip of a stylus and one of two defined zones in each lexeme-image box; or making contact between the tip of a stylus and a somewhat larger area of the touch-sensitive screen, either by tilting the stylus, or by moving a button carried by the stylus, or by maintaining contact for a longer or shorter period between the tip of the stylus and the touch-sensitive screen, etc.

To sum up, with a single command the user can select a lexeme-image from the first subcollection or root subcollection, with two commands the user can select a lexeme-image from the second subcollection, and with three commands a lexeme-image can be selected from the third subcollection. In the example shown where the input device has 40 boxes for lexeme-images., these three levels of subcollections make it possible to reach 64,000 lexeme-images. If the input device has 100 or 200 boxes per screen, it is possible to have millions of boxes available with three levels of subcollections. In addition, other levels can be added with practically limitless possibilities. Nevertheless, three levels of selection amongst subcollections are plenty for covering all of the ordinary "Flash Bren" language.

Naturally, there is no need for all of the subcollections to have the same number of lexeme-images, and some may be so extensive that recognizing the lexeme-images can present difficulties. It is then possibly advantageous to have a computer tool of the magnifying glass type enabling a portion of the corresponding subcollections to be magnified.

As mentioned above, it is also possible to mix in other signs or images with the lexeme-images. Thus, in technical communications, it can be advantageous to include in the series of lexeme-images symbols such as the standardized symbols in various technical fields (electricity, electronics, mechanics, etc.).

The above description relates to a logical implementation of the method of the invention in which the first or root subcollection is used to select an elementary unit of thought "bird" of general meaning, the second subcollection is used to specify "bird of the duck type", and the third subcollection is used for specifying in greater detail "bird of the duck type of the swan type".

There exists another possibility as shown diagrammatically in FIG. 9. This figure shows a lexeme-image meaning "oneirology". This concept relates to dreams (which are represented by associating a closed eye and a cloud ("oneiro")) and study (represented by the combination of a hand and a pencil ("logy")). In this example, this builds up to the "oneirology", lexeme-image in analytic manner by selecting from the root subcollection one of the four lexeme-images shown on the right (closed eye, cloud, hand, pencil). The second subcollection then comprises combinations having an analytic link with the lexeme-image selected in the root subcollection. For example, if the selected lexeme-image is cloud, then the lexeme-images in the second subcollection comprise those lexeme-images whose representations contain a cloud. If the lexeme-image "oneirology" is not in this subcollection, the "dream" lexeme-image is selected, and the third subcollection contains all of the lexeme-images that contain both a closed eye and a cloud.

To save and transmit documents prepared using the editing method of the invention, it is advantageous for each lexeme-image to be identified by a code, for example in the "Unicode" collection, thus enabling each lexeme-image to be transmitted in the form of a single "character" rather than as a graphic.

In a particularly advantageous variant for use by the blind, the appliance used has a keyboard in relief, and selection of a lexeme-image (which cannot be displayed under these circumstances) is accompanied by a lexeme sound being emitted, i.e. a sound representative of the lexeme-image and informing the blind person what has been selected. This enables the blind to write messages that are to be read, or possibly listened to, e.g. after being transmitted by e-mail.

The full collection of lexeme-images may be made available by downloading or on a magnetic medium, with the management of the collection and updating thereof preferably being the responsibility of an independent authority.

Various embodiments of appliances that enable the above method to be implemented are described below.

Figure 10:
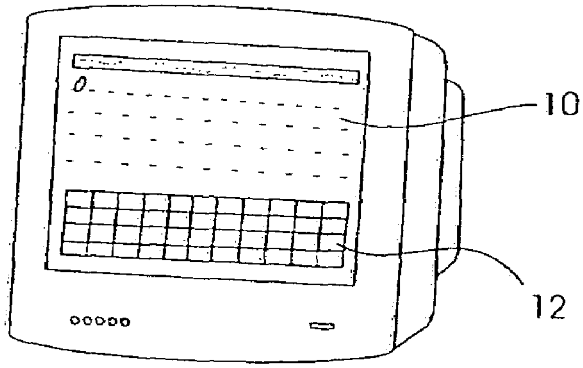
FIG. 10 is a diagram of an appliance constituting a first embodiment of an appliance of the invention.

FIG. 10 is a diagram of a first embodiment of an appliance for implementing the editing method of the invention. This appliance essentially comprises a touch-sensitive screen. The top portion 10 of the screen, which is not necessarily touch-sensitive, forms an edit window which may be of the type shown in FIGS. 3 to 5. The bottom portion 12 is a touch-sensitive zone which can display input zones which is not described in greater detail since it corresponds to the input device of FIGS. 6 to 9, for example.

In a variant, a specific command button such as 14 in FIG. 10, or a command applied using the touch-sensitive zone of the screen, makes it possible to create a graphics tablet on at least a portion of the touch-sensitive zone making it possible with a stylus to write lexeme-images. Each time a lexeme-image is recognized by shape recognition software, it is displayed in the edit window. Freehand drawing or writing may also be edited directly in graphics form, optionally formatted, in an edit line.

Figure 11:
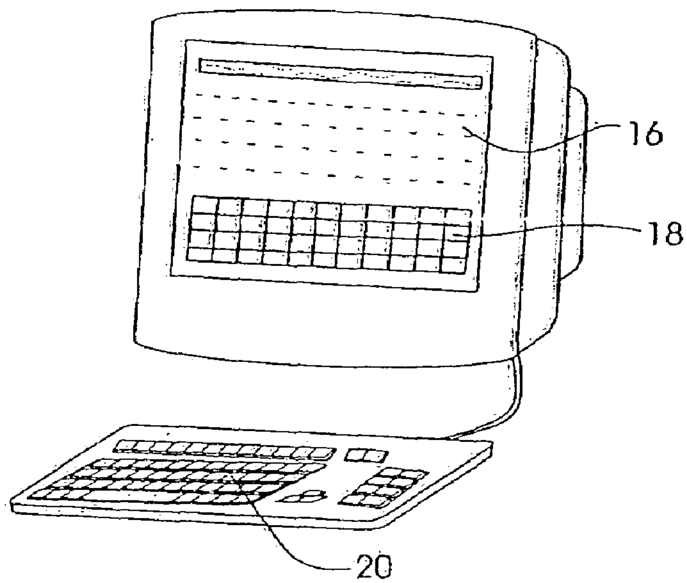
FIG. 11 is a diagram showing an appliance constitution a second embodiment of the invention.

In the second embodiment shown in FIG. 11, the appliance has a screen having in its top portion an edit window 16 of the kind shown in FIGS. 3 to 5, and in its bottom portion the image 18 of a keyboard 20 that is associated with the appliance. The keyboard 20 possesses keys carrying signs which are usually alphanumeric signs. Under such circumstances, the image 18 of the keyboard formed in the bottom half to the FIG. 11 screen is preferably an image which corresponds to the layout of the keyboard, and each square representing a key of the keyboard carries both the sign actually present on that key and the sign which will be called up depending on the selected function (alphanumeric, "Flash Bren", other language).

Figure 12:
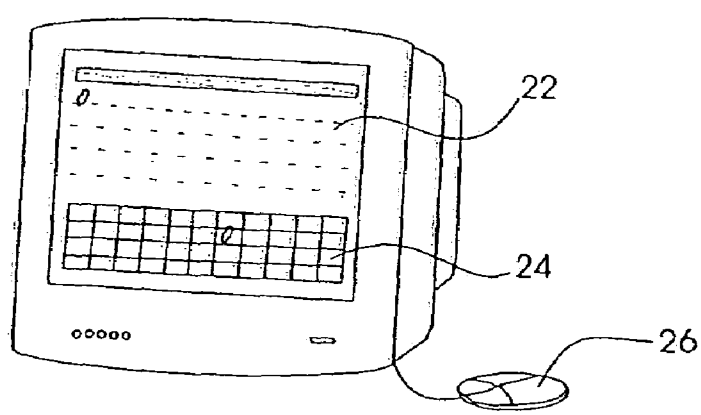
FIG. 12 is a diagram showing an appliance constituting a third embodiment of the invention.

In the third embodiment shown in FIG. 12, the appliance comprises a screen whose top portion likewise carries an edit window 22 and whose bottom portion carries an image 24 of a keyboard, analogous to that shown in FIGS. 6 to 9, and the appliance further comprises, in addition to the usual command button, a pointer device 26. This may be formed by a touch-sensitive area of the type often present on portable computers, or by a conventional mouse or a track ball.

Figure 13:
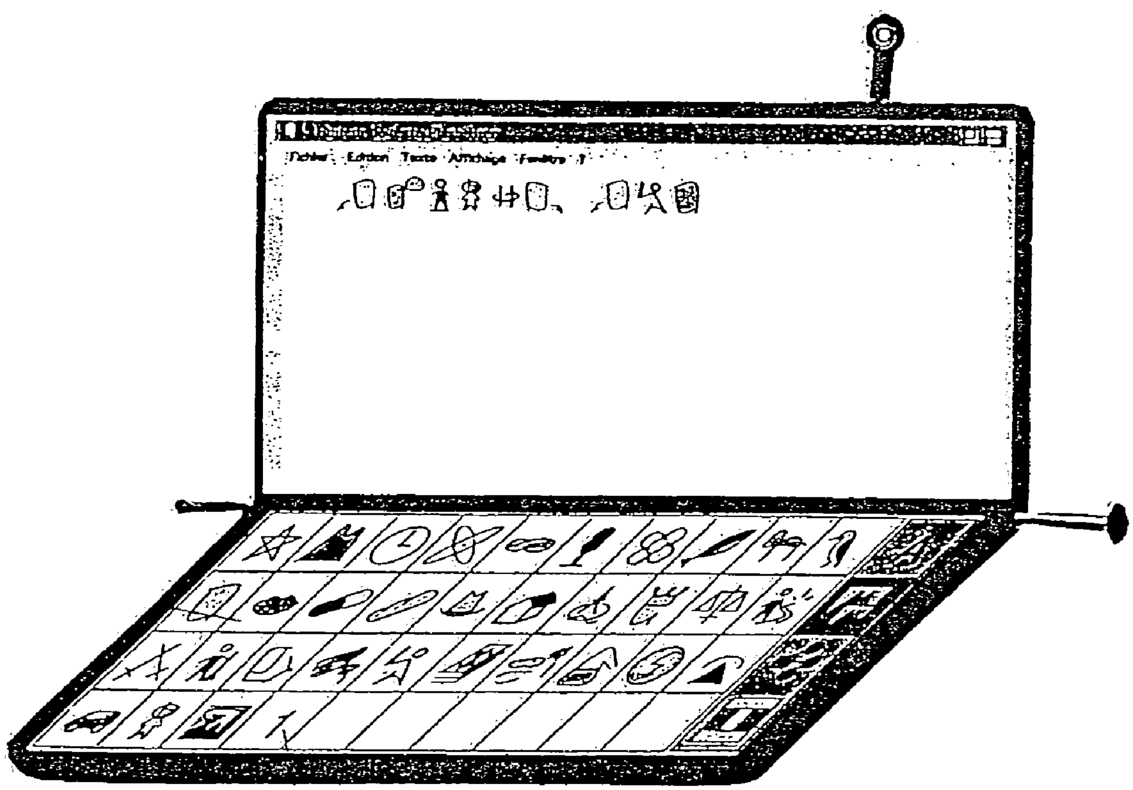
FIG. 13 is a simplified perspective view of an appliance of the invention.

Finally, FIG. 13 shows an embodiment of an appliance corresponding either to the first, or to the third embodiment described above, but in which the two portions forming the display device and the input device are separate and are hinged so that they can be closed one against the other. One of the portions represents a display screen constituting the display device of the invention, e.g. a liquid crystal display, and the bottom portion represents an input device in any form, either a touch-sensitive screen, or a screen carrying an image of a keyboard on which selection can be performed by means of a pointer device. One of the portions may carry on the outside all of the components of a mobile telephone. FIG. 13 can thus represent a mobile telephone constituting an appliance for "Flash Bren" natural language editing provided with an antenna and suitable for connection to the Internet via a mobile telephone network.

Reference has been made to elements that are well known in the art for making the electronic appliance, and they are not described in greater detail since these elements can be implemented in a wide variety of ways.

Similarly, the method and the appliance of the invention may include other known characteristics which complement the advantages or the editing options of the invention.

Figure 1:
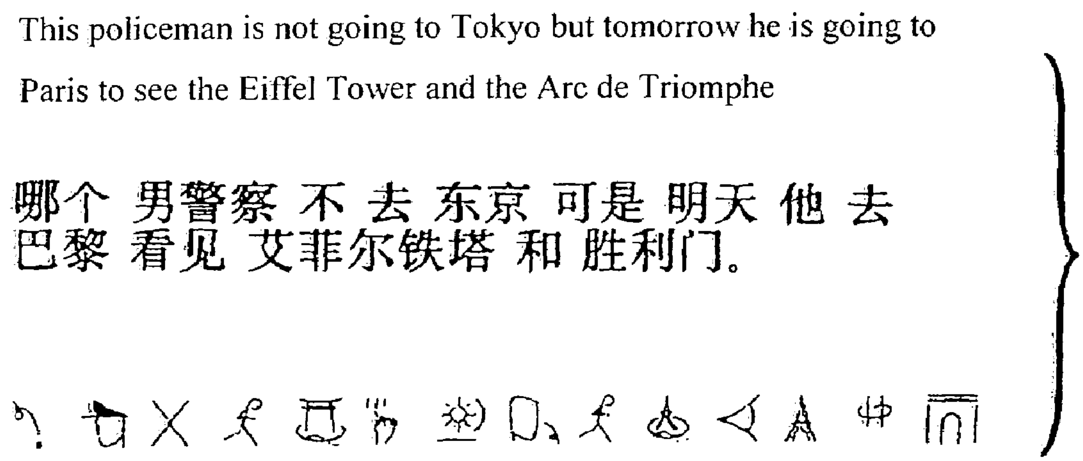
Figure 2:
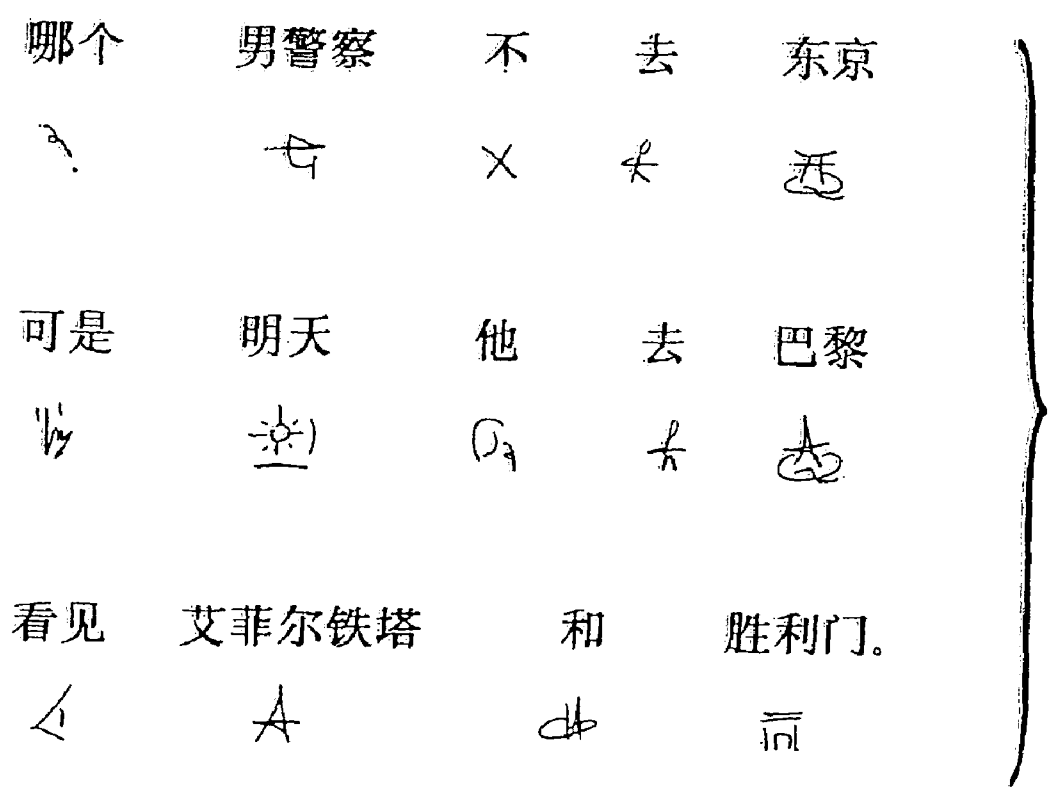

It is stated that the edit window presents lexeme-images placed side by side. It is also stated that with "Flash Bren" lexeme-images, the phonetic pronunciation and possibly also a corresponding word in a language may be displayed on parallel lines or on the same line. As shown in FIG. 2, with some languages, it is also possible to place characters or ideograms corresponding to the "Flash Bren" lexeme-images on parallel lines.

The method of the invention may be implemented on computers, in mobile telephones, or using other appliances. Nevertheless, it is very advantageous for the editing method to be implemented on an appliance connected to the Internet so as to enable Internet surfers of different languages to exchange messages in a common language, the "Flash Bren" natural language. Under such circumstances, it is advantageous for the "Flash Bren" editor to be incorporated in the e-mail system used by those appliances. It is also possible, particularly if the editing performed contains graphics elements, to transmit a corresponding document by fax.

Naturally, the above-described appliance may be provided with functions that are well known in electronics. For example, one such function is voice recognition. When the appliance has a microphone and includes voice recognition software, it can be used to write "Flash Bren" lexeme-images directly by recognizing uttered phonetic sounds.

The appliance may also have a voice synthesis system enabling speech corresponding to the sentences edited or to their translation into a specific language to be uttered.

Finally, the editing method advantageously implements numerous conventional word processor functions, in particular selection or cut-and-paste.

It may also be advantageous for the appliance to enable new lexeme-images to be introduced, either images created directly on the appliance, or updating images. When the appliance has a portion constituting a graphics tablet (first embodiment), it is possible in particular to introduce new lexeme-images. Naturally, the tablet can be used merely for inputting signs that are to be placed on one or more edit lines of the display device.

Naturally, the invention has been described and shown only by way of preferred example and any technical equivalents to its component elements may be applied without thereby going beyond the ambit of the invention.

What is claimed is:

1. An editing method for editing lexeme-images selected from a collection of lexeme-images using an electronic appliance possessing a display device and an input device, the display device having an editing zone and an input-representing zone, the method being characterized in that it comprises:

displaying in the input-representing zone a first subcollection of lexeme-images selected from the collection of lexeme-images; and executing a selection operation to select a lexeme-image from the first subcollection, the operation being selected from:

a first selection operation for selecting a lexeme-image of the first subcollection by a first command which causes the selected lexeme-image to be displayed in the editing zone of the display device; and a second selection operation for selecting a lexeme-image of the first subcollection by a second command which causes a second subcollection of lexeme-images associated with the selected lexeme-image to be displayed in the input-representing zone of the display device.

2. An editing method according to claim 1, characterized in that the lexeme-images of the first subcollection are representative of examples of thought that are simple and generic, and the lexeme-images of the second subcollection are representative of elements of thought that are more specific than the lexeme-images of the first subcollection.

3. An editing method according to claim 1, characterized in that the lexeme-images of the first subcollection are representative of elements of thought that are simple and generic, and the lexeme-images of the second subcollection are representative of elements of thought that are more specific and that contain at least a portion of the lexeme-image selected in the first subcollection.

4. An editing method according to claim 1, characterized in that when the input device is a keyboard, the method comprises displaying an image of the keyboard in the input-representing zone, in which image at least some of the keys carry two signs, firstly the sign carried by the corresponding key of the keyboard and secondly the lexeme-image that is selected by operating the key.

5. An editing method according to claim 1, 2, 3 or 4, characterized in that when the input device comprises a pointer device provided with at least two buttons, the first command comprises operating a first button and the second command comprises operating a second button.

6. An electronic appliance comprising a display device and an input device, the appliance being for implementing the editing method according to claim 1, and being characterized in that the display device comprises an editing zone (10) and an input-representing zone (12).

7. An appliance according to claim 6, characterized in that it has a touch-sensitive screen forming at least part of the input device.

8. An appliance according to claim 6, characterized in that it has a screen forming the display device and a keyboard (20) forming at least part of the input device, and the input-representing zone (18) of the screen contains an image of the keyboard.

9. An appliance according to claim 6, characterized in that it has a screen forming the display device and a pointer (22) forming the input device in co-operation with the input-representing zone (24) of the display device.

10. An appliance according to claim 6, 7, 8 or 9, characterized in that it further comprises a tool for connection to the Internet.

11. An appliance according to claim 6, 7, 8, or 9, characterized in that it comprises an input and/or display device comprising equally:

a graphic tablet with or without a shape recognition system for identifying drawings;

an alphanumeric keyboard;

a keyboard and/or a touch-sensitive screen;

a voice recognition tool; and a voice synthesis tool for each lexeme-image, in a selected phonetic system.

12. An appliance according to claim 6, 7, 8 or 9, characterized in that it further comprises a tool for emitting and receiving phonetic and/or visual messages of lexeme-image type via an electronic mail system, in particular the Internet.

13. An appliance according to claim 6, 7, 8 or 9, characterized in that it further comprises a tool for emitting and receiving phonetic messages and/or visual messages of lexeme-image type via an electronic communications system further constituting a mobile telephone with sound and/or corresponding lexeme-images.

* * * * *